(12) United States Patent
Ogawa

(10) Patent No.: US 7,253,796 B2
(45) Date of Patent: Aug. 7, 2007

(54) CIRCUIT FOR AND METHOD OF DRIVING LIQUID CRYSTAL PANEL OF LIQUID CRYSTAL PROJECTOR

(75) Inventor: Yasunori Ogawa, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 653 days.

(21) Appl. No.: 10/747,289

(22) Filed: Dec. 30, 2003

(65) Prior Publication Data

US 2004/0160397 A1     Aug. 19, 2004

(30) Foreign Application Priority Data

Feb. 14, 2003  (JP) ............................ 2003-036655

(51) Int. Cl.
G09G 3/36     (2006.01)
(52) U.S. Cl. ........................................ 345/87; 345/204
(58) Field of Classification Search .......... 345/87–100, 345/204
See application file for complete search history.

(56) References Cited

U.S. PATENT DOCUMENTS

| 5,669,686 | A | 9/1997 | Moon |
| 5,828,441 | A | 10/1998 | Narita et al. |
| 6,183,093 | B1 | 2/2001 | Sawai |
| 2004/0012616 | A1 | 1/2004 | Yokoyama et al. |

FOREIGN PATENT DOCUMENTS

| EP | 1 107 611 | 6/2001 |
| JP | 5-341260 | 12/1993 |
| JP | 6-265887 | 9/1994 |
| JP | 08-137008 | 5/1996 |
| JP | 08-320671 | 12/1996 |
| JP | 09-159985 | 6/1997 |
| JP | 10-055030 | 2/1998 |
| JP | 11-296127 | 10/1999 |
| JP | 11-338430 | 12/1999 |
| JP | 2000-020037 | 1/2000 |
| JP | 2000-330205 | 11/2000 |
| JP | 2000-347292 | 12/2000 |
| JP | 2001-016602 | 1/2001 |
| JP | 2001-028697 | 1/2001 |
| JP | 2001-056517 | 2/2001 |
| JP | 2001-134252 | 5/2001 |

(Continued)

Primary Examiner—Richard Hjerpe
Assistant Examiner—Jean Lesperance
(74) Attorney, Agent, or Firm—Young & Thompson

(57) ABSTRACT

A circuit for and a method of driving the liquid crystal panel of a liquid crystal projector make it possible to manufacture a projector having a plurality of light sources inexpensively. The circuit for driving the liquid crystal panel of a liquid crystal projector having a plurality of lamps as light sources has a CPU circuit for managing the overall system and data of the liquid crystal projector, a video signal processing circuit for converting a video signal input from an external source into a digital signal, and a panel correcting circuit for correcting the digital video signal generated by the video signal processing circuit depending on characteristics of a liquid crystal panel of the liquid crystal projector so as to match the liquid crystal panel. The CPU circuit outputs corrective data to the panel correcting circuit depending on how the lamps are energized, and the panel correcting circuit corrects the video signal using the corrective data.

19 Claims, 5 Drawing Sheets

FOREIGN PATENT DOCUMENTS

| | | |
|---|---|---|
| JP | 2001-166378 | 6/2001 |
| JP | 2001-169143 | 6/2001 |
| JP | 2001-231053 | 8/2001 |
| JP | 2001-343949 | 12/2001 |
| JP | 2001-343955 | 12/2001 |
| JP | 2002-101423 | 4/2002 |
| JP | 2002-108298 | 4/2002 |
| JP | 2002-116749 | 4/2002 |
| JP | 2002-122940 | 4/2002 |
| JP | 2002 223454 | 8/2002 |
| WO | 99/45714 | 9/1999 |

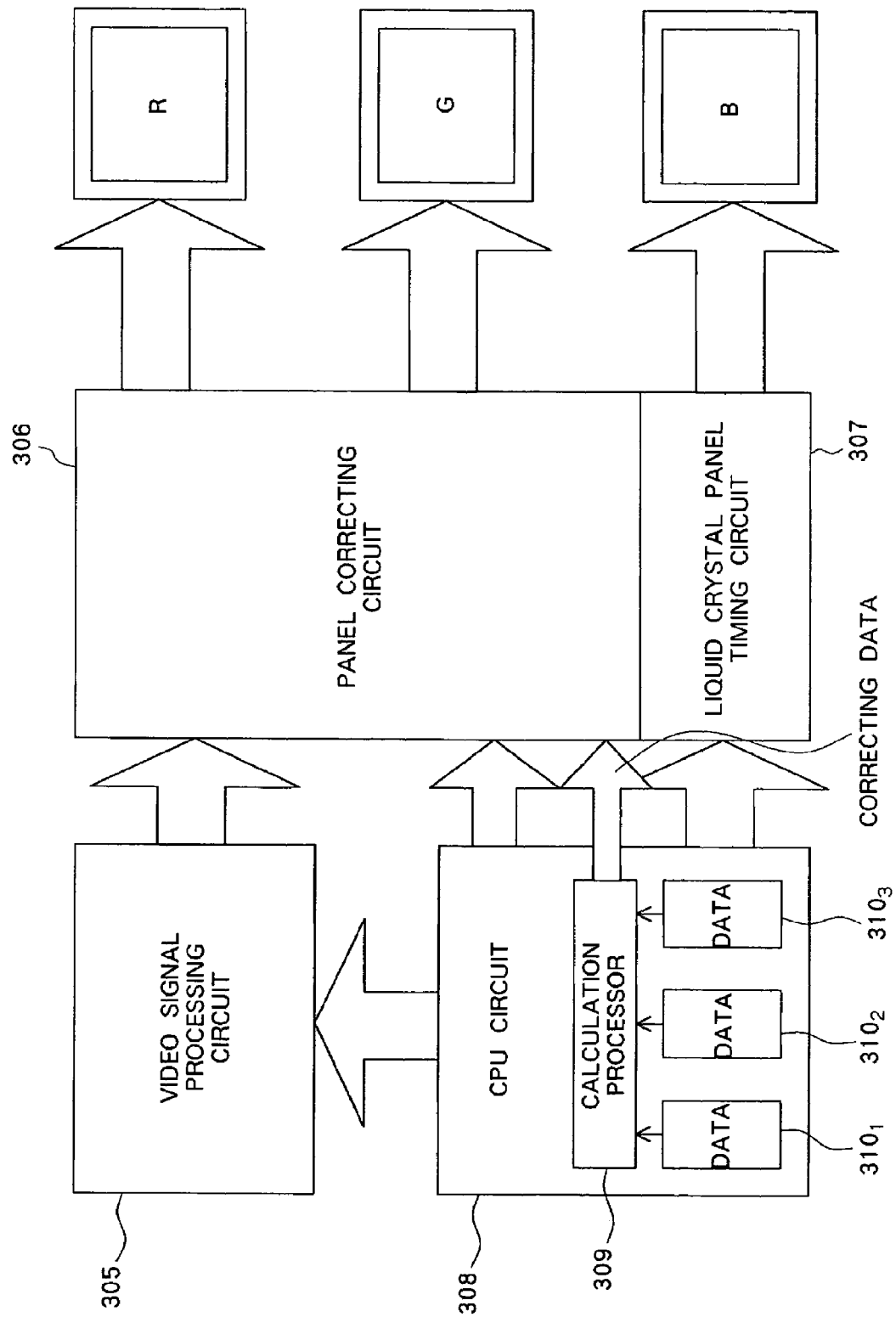

CIRCUIT FOR AND METHOD OF DRIVING LIQUID CRYSTAL PANEL OF LIQUID CRYSTAL PROJECTOR

BACKGROUND OF THE INVENTION

1. Field of the Invention

The present invention relates to a circuit for driving the liquid crystal panel of a liquid crystal projector, and more particularly to a circuit for and a method of driving the liquid crystal panel of a liquid crystal projector which has a plurality of lamps as light sources.

2. Description of the Related Art

FIG. 1 of the accompanying drawings is a block diagram showing an arrangement of an LCD driver circuit of a conventional liquid crystal projector.

As shown in FIG. 1, the LCD driver circuit of the conventional liquid crystal projector comprises CPU circuit 404 for managing the overall system and data of the liquid crystal projector, video signal processing circuit 405 for converting a video signal input from an external source into a digital signal with an A/D converter, panel correcting circuit 406 for correcting the digital video signal generated by video signal processing circuit 405 depending on the voltage vs. transmittance characteristics of a liquid crystal panel of the liquid crystal projector so as to match the liquid crystal panel, and liquid crystal panel timing circuit 407 for generating timing pulses for driving the liquid crystal panel.

If the video signal processed by video signal processing circuit 405 is directly applied to the liquid crystal panel, then, as shown in FIG. 2(a) of the accompanying drawings, a video image displayed on the liquid crystal panel will have poor gradations with uniform black and white levels due to the VT characteristics of the liquid crystal panel. When the video signal is corrected depending on the VT characteristics of the liquid crystal panel by liquid crystal panel timing circuit 407, a video image with good gradations is displayed on the liquid crystal panel, as shown in FIG. 2(b) of the accompanying drawings.

Heretofore, a lookup table (hereinafter referred to as "LUT") process has been used as a means for performing the VT characteristics correction on video signals. According to the LUT process, an input video signal is corrected to produce an output video signal based on data conversion using an LUT.

Single-lamp liquid crystal projectors having a single lamp as a light source may have only one pattern of VT characteristic correction data as data inherent in the single-lamp liquid crystal projectors.

Proposals for using a plurality of lamps as light sources in addition to increasing the light output of a single light source, as a means for providing a higher-luminance liquid crystal projector, are disclosed in Japanese laid-open patent publication No. 2001-166378 (patent document 1) and Japanese laid-open patent publication No. 6-265887 (patent document 2), for example.

One of the basic conditions for obtaining good video images on the final focusing screen of a liquid crystal projector is to apply light perpendicular and uniformly to the liquid crystal panel. Liquid crystal projectors having a plurality of light sources for achieving higher luminance have some peculiar problems in employing the plural light sources.

The invention disclosed in Japanese laid-open patent publication No. 6-265887 is addressed to the problem that a single-lamp liquid crystal projector will fail to display any images if the single light source is de-energized for some reasons. This publication reveals an illuminating device comprising a plurality of light sources, a light valve for modulating output light from the illuminating device with image information to produce a light image depending on the image information, and a uniform illuminating optical element disposed between the illuminating device and the light valve.

The invention disclosed in Japanese laid-open patent publication No. 2001-166378 is addressed to the problem that according to the arrangement disclosed in Japanese laid-open patent publication No. 6-265887, images from the respective light sources are separated into left and right images, and optical path differences are developed between R, G, B light beams, resulting in color irregularities. This publication shows two light sources and an optical system for combining light beams emitted from the respective light sources using a reflecting prism.

The technologies disclosed in Japanese laid-open patent publication No. 2001-166378 (patent document 1) and Japanese laid-open patent publication No. 6-265887 (patent document 2) serve to produce images of good quality with a projector having two lamps as light sources. Each of these technologies is based on optical system improvements for applying more uniform light to a liquid crystal panel. In a liquid crystal projector having a plurality of lamps, attempts to align the optical axes of the lamps would require complex arrangements and would be tedious and time-consuming, resulting in an increase in the manufacturing cost. These problems aggravate themselves if the number of lamps used as lamps increase.

SUMMARY OF THE INVENTION

The present invention has been made in view of the above problems of the conventional liquid crystal projectors. It is an object of the present invention to provide a circuit for and a method of driving the liquid crystal panel of a liquid crystal projector, which circuit and method make it possible to manufacture a projector having a plurality of light sources inexpensively.

According to the present invention, there is provided a circuit for driving the liquid crystal panel of a liquid crystal projector having a plurality of lamps as light sources, comprising a CPU circuit for managing overall system and data of the liquid crystal projector, a video signal processing circuit for converting a video signal input from an external source into a digital signal, and a panel correcting circuit for correcting the digital video signal generated by the video signal processing circuit depending on characteristics of a liquid crystal panel of the liquid crystal projector so as to match the liquid crystal panel, wherein the CPU circuit outputs corrective data depending on how the lamps are energized to the panel correcting circuit, and the panel correcting circuit corrects the video signal using the corrective data.

The liquid crystal panel may be of the transmissive type, and the CPU circuit may output corrective data to the panel correcting circuit depending on the voltage vs. transmittance characteristics, which vary depending on how the lamps are energized, of the liquid crystal panel.

The liquid crystal panel may be of the reflective type, and the CPU circuit may output corrective data to the panel correcting circuit depending on the voltage vs. reflectance characteristics, which vary depending on how the lamps are energized, of the liquid crystal panel.

The CPU circuit may have data which are different from each other depending on how the lamps are energized, for correcting the video signal depending on the characteristics of the liquid crystal panel in the panel correcting circuit, and output corresponding data depending on how the lamps are energized as corrective data to the panel correcting circuit.

The lamps may include two lamps, and the CPU circuit may have two data available when the two respective lamps are independently energized, calculates data corresponding to a state in which the two lamps are simultaneously energized, from the two data, and output corresponding data depending on how the lamps are energized as corrective data to the panel correcting circuit.

The lamps may include two lamps, and the CPU circuit may have data available when the two lamps are simultaneously energized, calculate data corresponding to a state in which the two lamps are independently energized, from the data available when two lamps are simultaneously energized, and output corresponding data depending on how the lamps are energized as corrective data to the panel correcting circuit.

The CPU circuit may store equations for obtaining the same results as data which are different from each other depending on how the lamps are energized, for correcting the video signal depending on the characteristics of the liquid crystal panel in the panel correcting circuit, calculate data which are different from each other depending on how the lamps are energized according to the stored equations, and output the calculated data as corrective data to the panel correcting circuit.

According to the present invention, there is also provided a method of driving the liquid crystal panel of a liquid crystal projector having a plurality of lamps as light sources, with a liquid crystal panel driver circuit comprising control means for managing the overall system and data of the liquid crystal projector, video signal processing means for converting a video signal input from an external source into a digital signal, and panel correcting means for correcting the digital video signal generated by the video signal processing circuit depending on characteristics of a liquid crystal panel of the liquid crystal projector so as to match the liquid crystal panel, the method comprising the steps of outputting corrective data depending on how the lamps are energized from the control means to the panel correcting means, and correcting the video signal with the panel correcting means using the corrective data.

The liquid crystal panel may be of the transmissive type, and the control means may output corrective data to the panel correcting means depending on the voltage vs. transmittance characteristics, which vary depending on how the lamps are energized, of the liquid crystal panel.

The liquid crystal panel may be of the reflective type, and the control means may output corrective data to the panel correcting means depending on the voltage vs. reflectance characteristics, which vary depending on how the lamps are energized, of the liquid crystal panel.

The control means may have data which are different from each other depending on how the lamps are energized, for correcting the video signal depending on the characteristics of the liquid crystal panel in the panel correcting means, and output corresponding data depending on how the lamps are energized as corrective data to the panel correcting means.

The lamps may include two lamps, and the control means may have two data available when two respective lamps are independently energized, calculate data corresponding to a state in which the two lamps are simultaneously energized, from the two data, and output corresponding data depending on how the lamps are energized as corrective data to the panel correcting means.

The lamps may include two lamps, and the control means may have data available when two lamps are simultaneously energized, calculate data corresponding to a state in which the two lamps are independently energized, from the data available when two lamps are simultaneously energized, and output corresponding data depending on how the lamps are energized as corrective data to the panel correcting means.

The control means may store equations for obtaining the same results as data which are different from each other depending on how the lamps are energized, for correcting the video signal depending on the characteristics of the liquid crystal panel in the panel correcting circuit, calculate data which are different from each other depending on how the lamps are energized according to the stored equations, and output the calculated data as corrective data to the panel correcting means.

The present invention is concerned with an LCD panel driver circuit for use in a transmissive liquid crystal projector having a plurality of lamps as light sources (hereinafter also referred to as "multi-lamp liquid crystal projector"). The LCD panel driver circuit has characteristic data and corrective data for the respective lamps for correcting different voltage vs. transmittance characteristics produced when the lamps are independently energized, due to different angles at which the optical axes of the lamps extend with respect to the liquid crystal panel, or correcting color irregularities produced when three colors, R, G, B, are combined, due to irregular amounts of light emitted from three liquid crystal panels, e.g., light in three colors, R, G, B.

The LCD panel driver circuit also generates characteristic data and corrective data at the time the lamps are simultaneously generated, from a plurality of corrective data, for optimizing VT characteristics correcting data or color irregularity correcting data at the time the lamps are simultaneously generated.

According to the present invention, even if light beams emitted from the lamps of the multi-lamp liquid crystal projector are applied at respective different angles to the liquid crystal panel, corrections inherent in the liquid crystal projector, typically optimum VT characteristics corrections and color irregularity corrections, can be made for producing optimum video images.

The above and other objects, features, and advantages of the present invention will become apparent from the following description with reference to the accompanying drawings which illustrate an example of the present invention.

BRIEF DESCRIPTION OF THE DRAWINGS

FIG. 5 is a block diagram of an arrangement of an LCD driver circuit according to an embodiment of the present invention.

DETAILED DESCRIPTION OF THE PREFERRED EMBODIMENT

Figure 3:
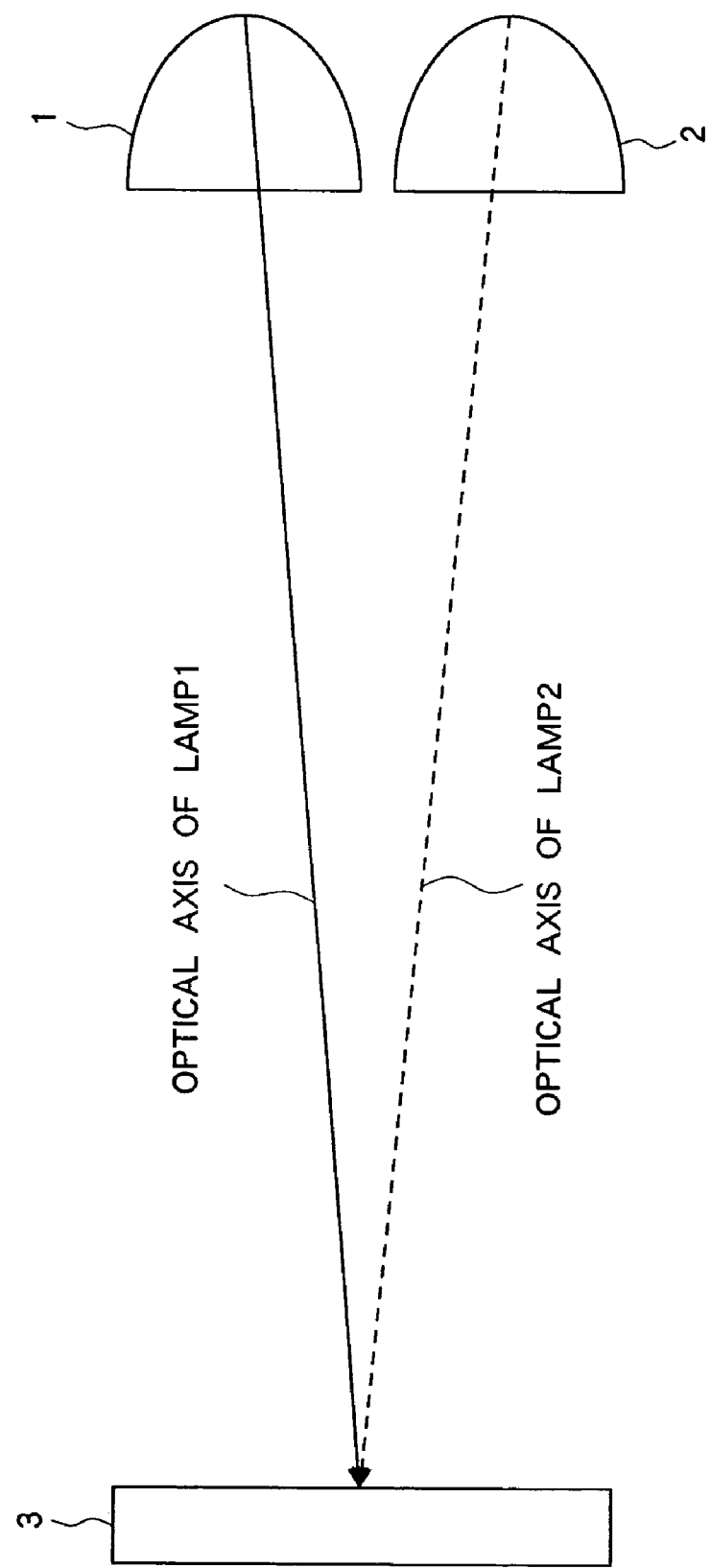
FIG. 3 is a view showing an optical system of a liquid crystal projector according to the present invention.

FIG. 3 shows an optical system of a liquid crystal projector according to the present invention.

As shown in FIG. 3, the optical system has two lamps 1, 2. Illuminating light emitted from each of lamps 1, 2 is applied to transmissive liquid crystal panel 3. Lamps 1, 2 have respective optical axes different from each other which extend at different angles with respect to liquid crystal panel 3.

Figure 4:
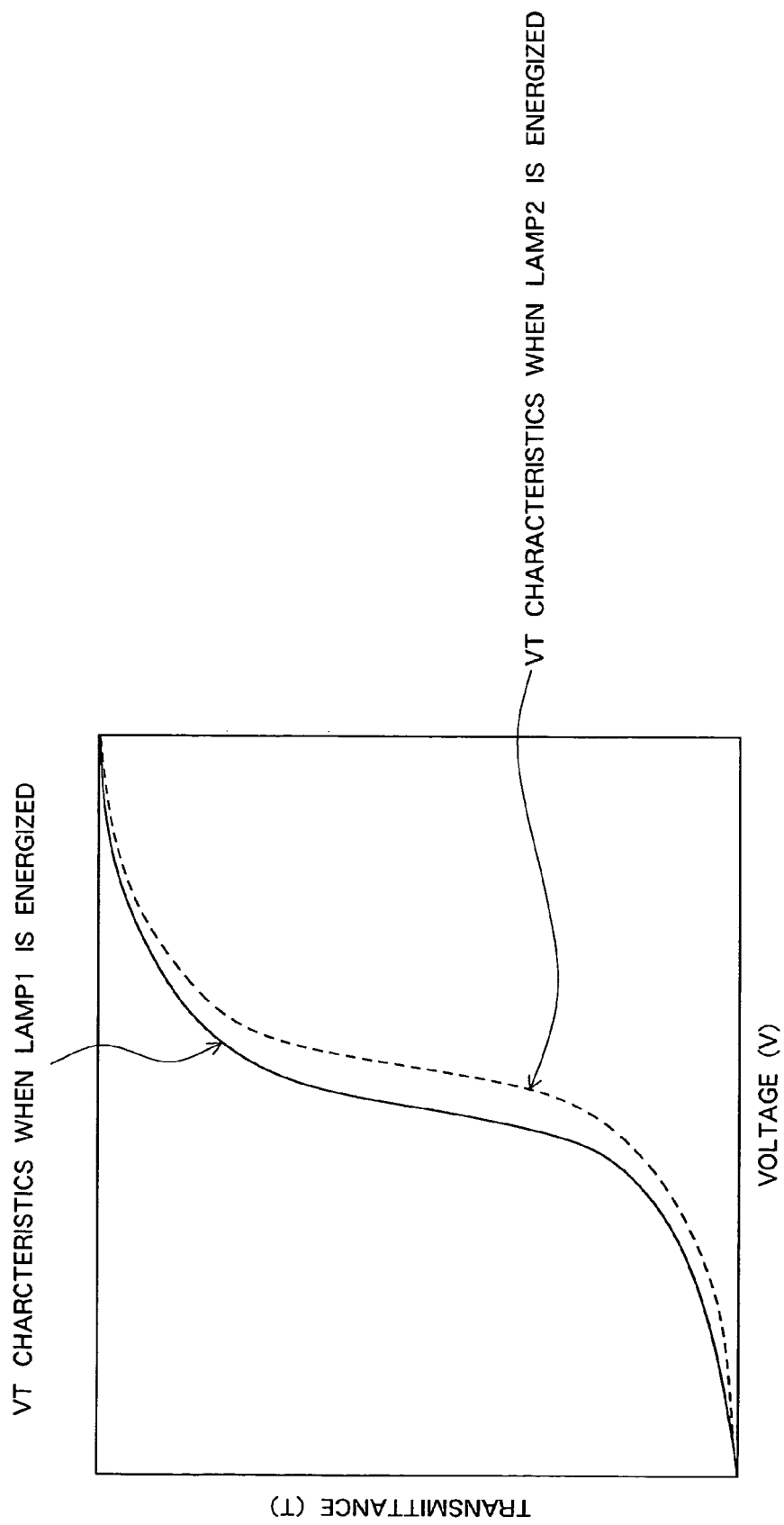
FIG. 4 is a diagram showing the voltage vs. transmittance characteristics of lamps of the liquid crystal projector based on different angles at which the optical axes of the lamps extend at different angles with respect to a liquid crystal panel.

FIG. 4 shows the voltage vs. transmittance characteristics (hereinafter referred to as "VT characteristics") of lamps 1, 2 based on the different angles at which the respective optical axes of lamps 1, 2 extend with respect to liquid crystal panel 3. As shown in FIG. 4, the optical axes of respective lamps 1, 2 extend at different angles with respect to liquid crystal panel 3. Because of the angle of field of liquid crystal panel 3, the VT characteristics which are produced when only lamp 1 is energized are different from the VT characteristics which are produced when only lamp 2 is energized. Although not shown the VT characteristics which are produced when both lamps 1, 2 are simultaneously energized are different from the VT characteristics illustrated in FIG. 4.

FIG. 5 shows in block form an arrangement of an LCD driver circuit according to an embodiment of the present invention.

Figure 1:
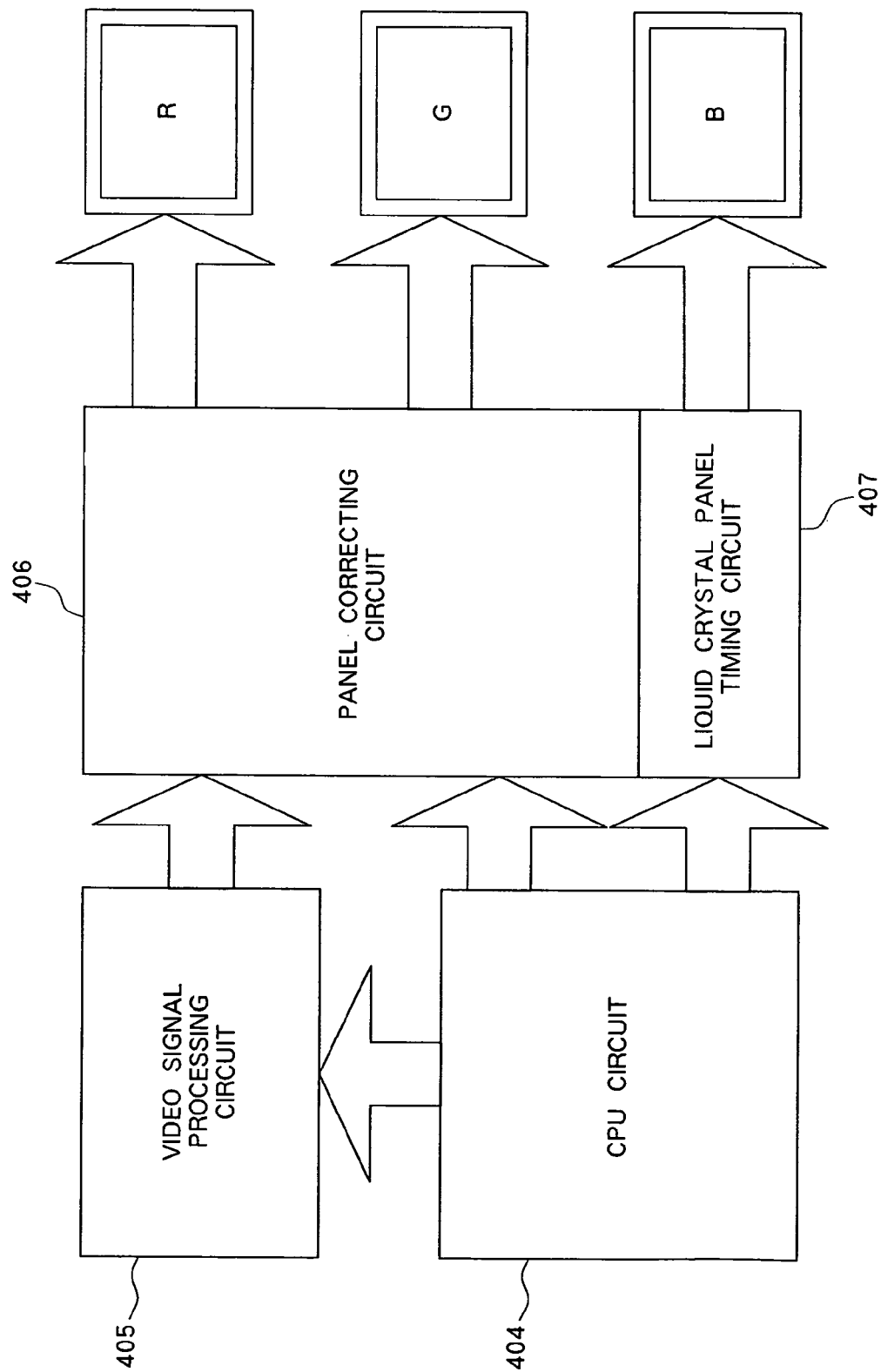
FIG. 1 is a block diagram of an arrangement of an LCD driver circuit of a conventional liquid crystal projector.
Figure 2:
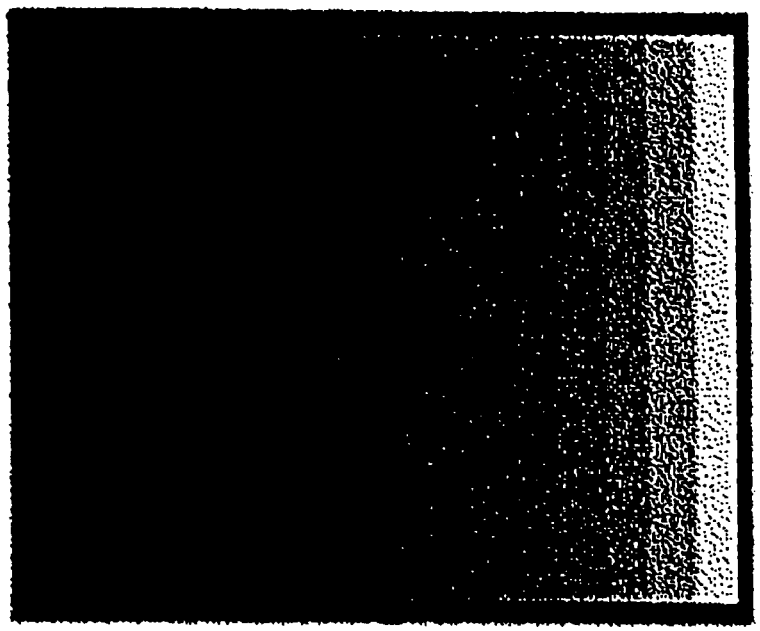
FIGS. 2(a) and 2(b) are diagrams showing gradations of images displayed by a liquid crystal projector.
Figure 2:
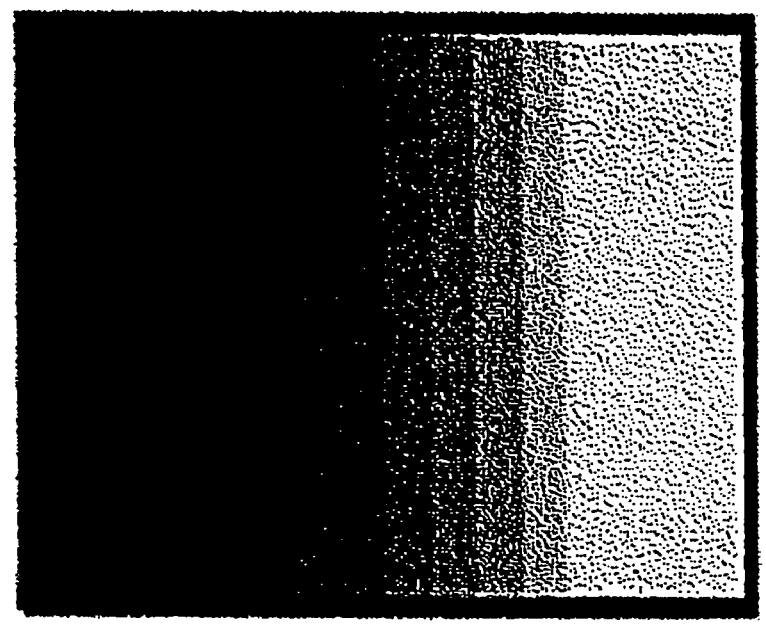

As shown in FIG. 5, the LCD driver circuit has CPU circuit 308 as a control means according to the embodiment, video signal processing circuit 305, panel correcting circuit 306, and liquid crystal panel timing circuit 307. CPU circuit 308, video signal processing circuit 305, panel correcting circuit 306, and liquid crystal panel timing circuit 307 operate in the manner as with CPU circuit 404, video signal processing circuit 405, panel correcting circuit 406, and liquid crystal panel timing circuit 407 shown in FIG. 1. However, CPU circuit 308 according to the present embodiment includes data $310_1$ through $310_3$ for correcting the VT characteristics, and calculation processor 309 for generating data for correcting the VT characteristics into optimum VT characteristics based on data $310_1$ through $310_3$.

Of data $310_1$ through $310_3$, data $310_1$ are data for correcting the VT characteristics produced when only lamp 1 is energized, data $310_2$ are data for correcting the VT characteristics produced when only lamp 2 is energized, and data $310_3$ are data for correcting the VT characteristics produced when both lamps 1, 2 are energized.

CPU circuit 308 reads either one of data $310_1$ through $310_3$ depending on how lamps 1, 2 are energized, and transfers the read data to calculation processor 309. When calculation processor 309 receives either one of data $310_1$ through $310_3$, if no instruction is given together with the data, then calculation processor 309 outputs the received data directly as corrective data to panel correcting circuit 306.

If lamps having different luminance levels due to their used times are employed as lamps 1, 2, then even when the VT characteristics are corrected with data $310_1$ through $310_3$, displayed images that are finally synthesized by the liquid crystal projector may not be sufficiently high in quality. Calculation processor 309 is provided to avoid the above drawback. When calculation processor 309 receives either one of data $310_1$ through $310_3$ together with an input representing the used times of lamps 1, 2 and an instruction for making adjustments depending on the used times of lamps 1, 2, calculation processor 309 corrects the received data depending on one or both of the used times, and outputs the corrected data to panel correcting circuit 306.

There are available various processes of correcting the received data with calculation processor 309. For example, if lamp 1 and lamp 2 are of the same type, then since the luminance difference therebetween can be estimated from the used times thereof, it is possible to correct the data depending on the used times of lamps 1, 2.

Alternatively, the user who will observe displayed images that are finally synthesized may manually enter an instruction for making adjustments, and it is possible to correct the data depending on the entered instruction.

Further alternatively, a detector for observing displayed images that are finally synthesized may be provided, and it is possible to correct the data depending on the output of the detector.

Data $310_1$ through $310_3$ are stored as LUT data. Alternatively, equations capable of producing the same results as data $310_1$ through $310_3$ may be stored, and a signal processor may be used to output corrective data according to the stored equations. Use of the equations offers the same advantages as with data $310_1$ through $310_3$, and in addition can reduce the amount of stored data.

If the VT characteristics have certain regularity, e.g., if data for correcting the VT characteristics of the lamps can be estimated from data for correcting the VT characteristics at the time the lamps are energized, or conversely if data for correcting the VT characteristics at the time the lamps are energized can be estimated from data for correcting the VT characteristics of the lamps, then one or two sets of data may be stored, and data in other modes may be calculated, thereby reducing the amount of stored data. The stored data may be stored as LUT data or equations capable of producing the same results as those data may be stored.

In the above embodiment, a liquid crystal projector having two lamps as light sources has been described. The number of lamps that can be used is not limited to two, and data for correcting the VT characteristics of lamps may be prepared depending on the number of the lamps.

The liquid crystal panel has been described as of the transmissive type. However, the liquid crystal panel may be of the reflective type. The transmissive liquid crystal panel tends to cause color irregularities due to different VT characteristics. Similarly, the reflective liquid crystal panel is liable to cause the same problem because of different voltage vs. reflectance characteristics. Therefore, a liquid crystal projector having a reflective liquid crystal panel may have data for correcting the voltage vs. reflectance characteristics rather than data for correcting the VT characteristics, thus offering the same advantages as those described above in the illustrated embodiment.

The present invention thus arranged offers the following advantages.

Since the characteristics are appropriately corrected depending on how the lamps are energized, it is possible to provide a circuit for and a method of driving the liquid crystal panel of a liquid crystal projector, which circuit and method make it possible to manufacture a projector having a plurality of light sources inexpensively.

While a preferred embodiment of the present invention has been described using specific terms, such description is for illustrative purposes only, and it is to be understood that changes and variations may be made without departing from the spirit or scope of the following claims.

What is claimed is:

1. A circuit for driving a liquid crystal panel of a liquid crystal projector having a plurality of lamps as light sources, comprising:
   a CPU circuit for managing the overall system and data of the liquid crystal projector;
   a video signal processing circuit for converting a video signal input from an external source into a digital signal; and
   a panel correcting circuit for correcting the digital video signal generated by said video signal processing circuit depending on characteristics of a liquid crystal panel of the liquid crystal projector so as to match the liquid crystal panel;
   wherein said CPU circuit outputs corrective data depending on how the lamps are energized to said panel correcting circuit, and said panel correcting circuit corrects the video signal using said corrective data, and
   wherein said CPU circuit has data which are different from each other depending on how the lamps are energized, for correcting the video signal depending on the characteristics of the liquid crystal panel in the panel correcting circuit, and outputs corresponding data depending on how the lamps are energized as corrective data to said panel correcting circuit.

2. A circuit according to claim 1, wherein said liquid crystal panel is of the transmissive type, and said CPU circuit outputs corrective data depending on the voltage vs. transmittance characteristics, which vary depending on how the lamps are energized, of the liquid crystal panel to said panel correcting circuit.

3. A circuit according to claim 1, wherein said liquid crystal panel is of the reflective type, and said CPU circuit outputs corrective data depending on the voltage vs. reflectance characteristics, which vary depending on how the lamps are energized, of the liquid crystal panel to said panel correcting circuit.

4. A circuit for driving a liquid crystal panel of a liquid crystal projector having a plurality of lamps as light sources, comprising:
   a CPU circuit for managing the overall system and data of the liquid crystal projector;
   a video signal processing circuit for converting a video signal input from an external source into a digital signal; and
   a panel correcting circuit for correcting the digital video signal generated by said video signal processing circuit depending on characteristics of a liquid crystal panel of the liquid crystal projector so as to match the liquid crystal panel;
   wherein said CPU circuit outputs corrective data depending on how the lamps are energized to said panel correcting circuit, and said panel correcting circuit corrects the video signal using said corrective data,
   wherein said lamps include two lamps, and said CPU circuit has two data available when the two respective lamps are independently energized, calculates data corresponding to a state in which the two lamps are simultaneously energized, from said two data, and outputs corresponding data depending on how the lamps are energized as corrective data to said panel correcting circuit.

5. A circuit for driving a liquid crystal panel of a liquid crystal projector having a plurality of lamps as light sources, comprising:
   a CPU circuit for managing the overall system and data of the liquid crystal projector;
   a video signal processing circuit for converting a video signal input from an external source into a digital signal; and
   a panel correcting circuit for correcting the digital video signal generated by said video signal processing circuit depending on characteristics of a liquid crystal panel of the liquid crystal projector so as to match the liquid crystal panel;
   wherein said CPU circuit outputs corrective data depending on how the lamps are energized to said panel correcting circuit, and said panel correcting circuit corrects the video signal using said corrective data,
   wherein said lamps include two lamps, and said CPU circuit has data available when the two lamps are simultaneously energized, calculates data corresponding to a state in which the two lamps are independently energized, from said data available when two lamps are simultaneously energized, and outputs corresponding data depending on how the lamps are energized as corrective data to said panel correcting circuit.

6. A circuit for driving a liquid crystal panel of a liquid crystal projector having a plurality of lamps as light sources, comprising:
   a CPU circuit for managing the overall system and data of the liquid crystal projector;
   a video signal processing circuit for converting a video signal input from an external source into a digital signal; and
   a panel correcting circuit for correcting the digital video signal generated by said video signal processing circuit depending on characteristics of a liquid crystal panel of the liquid crystal projector so as to match the liquid crystal panel;
   wherein said CPU circuit outputs corrective data depending on how the lamps are energized to said panel correcting circuit, and said panel correcting circuit corrects the video signal using said corrective data,
   wherein said CPU circuit stores equations for obtaining the same results as data which are different from each other depending on how the lamps are energized, for correcting the video signal depending on the characteristics of the liquid crystal panel in the panel correcting circuit, calculates data which are different from each other depending on how the lamps are energized according to the stored equations, and outputs the calculated data as corrective data to said panel correcting circuit.

7. A method of driving a liquid crystal panel of a liquid crystal projector having a plurality of lamps as light sources, with a liquid crystal panel driver circuit comprising control means for managing overall system and data of the liquid crystal projector, video signal processing means for converting a video signal input from an external source into a digital signal, and panel correcting means for correcting the digital video signal generated by said video signal processing circuit depending on characteristics of a liquid crystal panel of the liquid crystal projector so as to match the liquid crystal panel, said method comprising the steps of:
   outputting corrective data depending on how the lamps are energized from said control means to said panel correcting means; and
   correcting the video signal with said panel correcting means using said corrective data, wherein,
   said lamps include two lamps, and said control means has two data available when two respective lamps are independently energized, calculates data corresponding to a state in which the two lamps are simultaneously energized, from said two data, and outputs corresponding data depending on how the lamps are energized as corrective data to said panel correcting means.

8. A method according to claim 7, wherein said liquid crystal panel is of the transmissive type, and said control means outputs corrective data to said panel correcting means depending on the voltage vs. (original) transmittance characteristics, which vary depending on how the lamps are energized, of the liquid crystal panel.

9. A method according to claim 7, wherein said liquid crystal panel is of the reflective type, and said control means outputs corrective data to said panel correcting means depending on the voltage vs. reflectance characteristics, which vary depending on how the lamps are energized, of the liquid crystal panel.

10. A method according to claim 7, wherein said control means has data which are different from each other depending on how the lamps are energized, for correcting the video signal depending on the characteristics of the liquid crystal panel in the panel correcting means, and outputs corresponding data to said panel correcting means depending on how the lamps are energized as corrective data.

11. A method of driving a liquid crystal panel of a liquid crystal projector having a plurality of lamps as light sources, with a liquid crystal panel driver circuit comprising control means for managing overall system and data of the liquid crystal projector, video signal processing means for converting a video signal input from an external source into a digital signal, and panel correcting means for correcting the digital video signal generated by said video signal processing circuit depending on characteristics of a liquid crystal panel of the liquid crystal projector so as to match the liquid crystal panel, said method comprising the steps of:
outputting corrective data depending on how the lamps are energized from said control means to said panel correcting means; and
correcting the video signal with said panel correcting means using said corrective data,
wherein said lamps include two lamps, and said control means has data available when two lamps are simultaneously energized, calculates data corresponding to a state in which the two lamps are independently energized, from said data available when two lamps are simultaneously energized, and outputs corresponding data depending on how the lamps are energized as corrective data to said panel correcting means.

12. A method of driving a liquid crystal panel of a liquid crystal projector having a plurality of lamps as light sources, with a liquid crystal panel driver circuit comprising control means for managing overall system and data of the liquid crystal projector, video signal processing means for converting a video signal input from an external source into a digital signal, and panel correcting means for correcting the digital video signal generated by said video signal processing circuit depending on characteristics of a liquid crystal panel of the liquid crystal projector so as to match the liquid crystal panel, said method comprising the steps of:
outputting corrective data depending on how the lamps are energized from said control means to said panel correcting means; and
correcting the video signal with said panel correcting means using said corrective data,
wherein said control means stores equations for obtaining the same results as data which are different from each other depending on how the lamps are energized, for correcting the video signal depending on the characteristics of the liquid crystal panel in the panel correcting circuit, calculates data which are different from each other depending on how the lamps are energized according to the stored equations, and outputs the calculated data as corrective data to said panel correcting means.

13. A circuit for driving a liquid crystal panel of a liquid crystal projector having a plurality of lamps as light sources, comprising:
a CPU circuit for managing the overall system and data of the liquid crystal projector;
a video signal processing circuit for converting a video signal input from an external source into a digital signal; and
a panel correcting circuit for correcting the digital video signal generated by said video signal processing circuit depending on characteristics of a liquid crystal panel of the liquid crystal projector so as to match the liquid crystal panel;
a correction memory corresponding respectively to each lamp, each correction memory including color correction data for the corresponding lamp;
wherein said CPU circuit outputs said corrective data to said panel correcting circuit depending on whether the lamps are energized individually or simultaneously, and said panel correcting circuit corrects the video signal using said corrective data in a first manner when said lamps are energized individually and in a second manner when said lamps are energized simultaneously.

14. A circuit according to claim 13, wherein said liquid crystal panel is of the transmissive type, and said CPU circuit outputs corrective data depending on the voltage vs. transmittance characteristics, which vary depending on how the lamps are energized, of the liquid crystal panel to said panel correcting circuit.

15. A circuit according to claim 13, wherein said liquid crystal panel is of the reflective type, and said CPU circuit outputs corrective data depending on the voltage vs. reflectance characteristics, which vary depending on how the lamps are energized, of the liquid crystal panel to said panel correcting circuit.

16. A circuit according to claim 13, wherein said CPU circuit has data which are different from each other depending on how the lamps are energized, for correcting the video signal depending on the characteristics of the liquid crystal panel in the panel correcting circuit, and outputs corresponding data depending on how the lamps are energized as corrective data to said panel correcting circuit.

17. A circuit according to claim 13,
wherein said lamps include two lamps, and said CPU circuit has two data available when the two respective lamps are independently energized, calculates data corresponding to a state in which the two lamps are simultaneously energized, from said two data, and outputs corresponding data depending on how the lamps are energized as corrective data to said panel correcting circuit.

18. A circuit according to claim 13,
wherein said lamps include two lamps, and said CPU circuit has data available when the two lamps are simultaneously energized, calculates data corresponding to a state in which the two lamps are independently energized, from said data available when two lamps are simultaneously energized, and outputs corresponding data depending on how the lamps are energized as corrective data to said panel correcting circuit.

19. A circuit according to claim 13, wherein said CPU circuit stores equations for obtaining, the same results as data which are different from each other depending on how the lamps are energized, for correcting the video signal depending on the characteristics of the liquid crystal panel in the panel correcting circuit, calculates data which are different from each other depending on how the lamps are energized according to the stored equations, and outputs the calculated data as corrective data to said panel correcting circuit.

* * * * *